(12) United States Patent
Kleinewegen et al.

(10) Patent No.: US 10,948,023 B2
(45) Date of Patent: Mar. 16, 2021

(54) MULTI-PLATE COUPLING

(71) Applicant: Siemens Aktiengesellschaft, München (DE)

(72) Inventors: Stefan Kleinewegen, Bocholt (DE); Michael Cichetzki, Vreden (DE); Andreas Farwick, Ahaus (DE)

(73) Assignee: Flender GmbH, Bocholt (DE)

( * ) Notice: Subject to any disclaimer, the term of this patent is extended or adjusted under 35 U.S.C. 154(b) by 296 days.

(21) Appl. No.: 15/947,175

(22) Filed: Apr. 6, 2018

(65) Prior Publication Data

US 2018/0291964 A1    Oct. 11, 2018

(30) Foreign Application Priority Data

Apr. 7, 2017  (EP) .................. 17165549

(51) Int. Cl.
| | |
|---|---|
| *F16D 3/79* | (2006.01) |
| *F16D 3/78* | (2006.01) |
| *F16B 35/00* | (2006.01) |
| *F16B 37/14* | (2006.01) |

(52) U.S. Cl.
CPC ............. *F16D 3/79* (2013.01); *F16B 35/005* (2013.01); *F16B 37/145* (2013.01); *F16D 3/78* (2013.01)

(58) Field of Classification Search
CPC ..... F16D 3/79; F16D 3/78; F16D 3/50; F16B 35/005; F16B 37/145
USPC ......................... 464/93–96, 98, 99
See application file for complete search history.

(56) References Cited

U.S. PATENT DOCUMENTS

| | | | |
|---|---|---|---|
| 1,322,127 A | * | 11/1919 | Ludeman .................. F16D 3/79 464/99 |
| 4,708,692 A | | 11/1987 | Weiss |
| 4,744,783 A | | 5/1988 | Downey et al. |
| (Continued) | | | |

FOREIGN PATENT DOCUMENTS

| | | |
|---|---|---|
| CN | 2073956 U | 3/1991 |
| CN | 203308958 U | 11/2013 |
| CN | 203500315 U | 3/2014 |
| (Continued) | | |

OTHER PUBLICATIONS

Stefan Kleinewegen, U.S. Pat. No. 9,638,263, May 2, 2017, 2016-0319884, Nov. 3, 2016.
(Continued)

*Primary Examiner* — Greg Binda

(74) *Attorney, Agent, or Firm* — Henry M. Feiereisen LLC

(57) ABSTRACT

A multi-plate coupling includes two connecting flanges and an intermediate member arranged between the connecting flanges. A plate pack crown is arranged between each of the connecting flanges and the intermediate member. The plate pack crown is alternately connected to the associated connecting flange and the intermediate member by screw fasteners which are guided through continuous fastening bores arranged in the plate pack crown. At least one of the fastening bores of the plate pack crown has a contour diverging from the circular shape. A positive-locking element having a corresponding outer contour is inserted into the fastening bore. A component bears on the outer contour of the positive-locking element in a positive-locking manner and provides a bending edge for the plate pack crown.

7 Claims, 14 Drawing Sheets

(56) References Cited

U.S. PATENT DOCUMENTS 10,495,152 B2 * 12/2019 Marks .................. F16D 3/78
2016/0319886 A1   11/2016 Kleinewegen

FOREIGN PATENT DOCUMENTS

DE      2036041 A1    1/1972
DE      3437388 A1    6/1985
DE    34 43 485 A1    6/1986
EP      1146238 A2   10/2001

OTHER PUBLICATIONS

Stefan Kleinewegen, U.S. Pat. No. 9,689,435, Jun. 27, 2017, 2016-0319885, Nov. 3, 2016.

* cited by examiner

MULTI-PLATE COUPLING

CROSS-REFERENCES TO RELATED APPLICATIONS

This application claims the priority of European Patent Application, Serial No. EP 17165549.1, filed Apr. 7, 2017, pursuant to 35 U.S.C. 119(a)-(d), the disclosure of which is incorporated herein by reference in its entirety as if fully set forth herein.

BACKGROUND OF THE INVENTION

The present invention relates to a multi-plate coupling.

The following discussion of related art is provided to assist the reader in understanding the advantages of the invention, and is not to be construed as an admission that this related art is prior art to this invention.

In a multi-plate coupling, transmission of torque between machines that are to be connected, together with simultaneous misalignment compensation, takes place in a manner that is free of backlash, torsionally rigid and flexibly resilient. The misalignment compensation can be realized in axial, angular and radial directions. Multi-plate couplings, in particular torsionally rigid all-steel multi-plate couplings, can be used in all applications where there is a requirement for transmission of torque with simultaneous shaft displacement. Torsionally rigid all-steel multi-plate couplings are suitable i.a. for driving pumps, fans, compressors, generator and turbine drives, as well as paper and printing machine drives. All-steel multi-plate couplings are suitable for application in potentially explosive environments and at low temperatures.

With conventional multi-plate couplings, which have a circular collar or ring on the bolted flange joints, there arises the problem that in the event of a deflection of the plate pack crown, as happens constantly during the operation of the multi-plate coupling, the collar or ring continually subjects the top plate of the plate pack crown to load at the same point, namely at the shortest connecting point of two adjacent bolt attachment points of the bolted flange joints. As a consequence of the continuous loading over long periods of time, the laminated plate material becomes fatigued at said exposed point and is rendered susceptible to wear and tear there, e.g. to rust and breakage.

It would therefore be desirable and advantageous to provide an improved multi-plate coupling to obviate prior art shortcomings.

SUMMARY OF THE INVENTION

According to one aspect of the present invention, a multi-plate coupling includes two connecting flanges, an intermediate member arranged between the connecting flanges, plate pack crowns, one of the plate pack crowns being arranged between one of the connecting flanges and the intermediate member, and another one of the plate pack crowns being arranged between the other one of the connecting flanges and the intermediate member, screw fasteners guided through continuous fastening bores in the plate pack crowns in alternating manner to connect the plate pack crowns to the connecting flanges, with at least one of the fastening bores of the plate pack crowns having a contour diverging from the circular shape, a positive-locking element configured for insertion into the at least one of the fastening bores and having an outer contour corresponding to the contour of the at least one of the fastening bores, and a component configured to bear on the outer contour of the positive-locking element in a positive-locking manner to provide a bending edge for an associated one of the plate pack crowns.

In the multi-plate coupling according to the invention, components having a noncircular outer contour, specifically components having a bending edge, bear against the top plates of the plate pack. According to the invention, the exposed bending point of the plate pack, which bending point is present in conventional multi-plate couplings and which is due to components having a circular outer contour, is extended into a linear bending edge; this results in a significant reduction in the tension in the bending region of the plate pack. For example, the collar or, as the case may be, the ring or rings of the multi-plate coupling according to the invention are no longer circular in shape, but form a polygon, such that a linear bending edge is present as opposed to a punctiform contact. Owing to the linear bending edge, the compressive force is distributed over a distance, and no longer acts on a single point as previously. As a consequence, the permissible torque for the multi-plate coupling is increased and the permissible shaft misalignment range extended.

To be certain that the linear bending edge does not twist out of alignment, but at all times remains at the same position where the bending of the plate pack becomes effective, it is necessary to ensure that the component serving as the bending edge has a torsion-proof stop: Owing to the contour of the fastening bores of the plate pack crown diverging from the circular shape and the outer contour corresponding to the contour of the fastening bores of the positive-locking element inserted into the fastening bore, the positive-locking element is arranged in a torsion-proof manner in the plate pack crown. The component serving the plate pack crown as a bending edge bears on the outer contour of the positive-locking element in a positive-locking manner, i.e. the inner contour of the component acting as a bending edge corresponds for its part to the outer contour of the positive-locking element. As a result, the component acting as a bending edge is also arranged in a torsion-proof manner in relation to the plate pack crown.

For example, a bush inserted into the fastening bore is not circular on the outer circumference, but has an outer circumference contour making a torsional twisting impossible, e.g. a straight edge, a polygon, or the like. The fastening bore in the plate pack must be correspondingly noncircular or polygonal in shape. On the inner circumference, the bush can continue to be circular, since a threaded bolt is inserted therein. Examples of positive-locking contours are a rounded polygon, a flattened circle having at least one straight edge, a slotted bush in combination with ring and laminated plates having a projecting nose, and a splined toothing arrangement.

Apart from a positive-locking fit, as described, the torsion-proof stop between the bush and the ring or rings can also be realized by means of a force fit or even material-to-material bonding. Examples of a material-to-material torsion-proof stop are connections formed by means of adhesive bonding and welding. An example of a force-fit torsion-proof stop is a join formed by an interference fit, advantageously in the warm state.

Advantageously, the connecting flanges can be embodied as ring-shaped flanges, the ring plane of which extends transversely with respect to the axis of rotation of the multi-plate coupling. The connecting flanges can be mounted in a torsionally rigid manner on separate hub elements that are provided for mounting on shaft ends or stub shafts, e.g. by means of threaded connections. The connecting flanges can also be integrally embodied in a single piece with such hub elements.

The intermediate member arranged between the connecting flanges likewise can have flanges, advantageously embodied as ring-shaped flanges, the ring plane of which extends transversely with respect to the axis of rotation of the multi-plate coupling. In this configuration, the two flanges, embodied in a single piece or as separate mountable components, can be arranged at the ends of a sleeve piece whose axis coincides with the axis of rotation of the coupling. It is also possible for the sleeve piece to be omitted and for the two flanges to be combined in one flange, i.e. for the intermediate member to be embodied as a washer or as a ring.

The plate pack crown, which is also referred to as a plate pack or laminated plates, serves as the flexible elements in a multi-plate coupling. The individual thin plates can be joined together by means of a collar bush and a ring to form a compact plate pack. In this arrangement, the collar bush includes a continuous bush in the form of a cylindrical body, at one axial end of which there is arranged a ring-shaped collar. The cylindrical body of the bush can be pushed so far through a fastening bore leading through the plate pack that the collar bears against the end face of the plate pack, i.e. on the surface the topmost plate. On the opposite end face of the plate pack, i.e. on the surface of the bottommost plate, the ring can be slipped over the bush such that the ring bears on the surface of the bottommost plate. The end of the bush can be flanged with the ring. In this arrangement, the bush is deformed toward the outside at its end. The deformation is made possible by the free space in the region of the bevel of the ring. As a result of the deformation, the ring is pressed axially against the top plate. A screw fastener which fastens the plate pack to one of the two flanges, e.g. a threaded bolt having a threaded nut, can be inserted through an axial bore of the bush, the plate pack being braced against the collar and the ring.

The individual thin plates of the plate pack crown can also be joined together to form a compact plate pack by means of a bush having two rings. In this arrangement, a bush without collar is pushed into the plate pack and a ring is fixedly flanged with the bush on each of the two sides. A screw fastener, e.g. a threaded bolt having a threaded nut, can be guided through an axial bore of the cylindrical body and fastened to one of the two flanges by means of a threaded nut, the plate pack being clamped against the rings.

The individual thin plates can also be joined together to form a compact plate pack by means of a screw fastener, onto which two rings are fitted which are in turn press-fitted to the plate pack by means of threaded nuts screwed onto the ends of the screw fastener. In this arrangement, the screw fastener can assume the function of a bush.

According to another advantageous feature of the present invention, the positive-locking element can be configured in the form of a bush having two rings respectively bearing against two end faces of the associated one of the plate pack crowns to provide the bending edge for said plate pack crown, with the rings having an inner contour which corresponds to the outer contour of the bush. In this arrangement, the rings serve the plate pack crown as bending edges and their inner contour corresponds to the outer contour of the bush. An advantage of this embodiment is that as a result of a flanging of the bush with the rings, the rings are pressed axially against the top plates of the plate pack crown and consequently the individual thin plates can already be joined together to form a compact plate pack. A further advantage of this embodiment is that the bush in combination with the two rings forms a relatively low-cost construction.

According to another advantageous feature of the present invention, the positive-locking element can be shaped in the form of a bush which has a collar in an axial end section. The collar can be integrally embodied with the bush in a single piece, i.e. the combination of bush and collar forms a component known as a collar bush. In this arrangement, the collar bears against an end face of the plate pack crown. In addition, in the other end section, the bush carries a ring which bears against the other end face of the plate pack crown. In this arrangement, the inner contour of the ring corresponds to the outer contour of the bush; the ring is thus seated in a torsion-proof manner in relation to the plate pack crown. The collar and the ring furthermore serve the plate pack crown as bending edges. An advantage of this embodiment is that, in contrast to the "bush with two rings" variant, no flanging operation is necessary.

According to another advantageous feature of the present invention, the positive-locking element can be shaped in the form of a bush that has a circular inner contour. An advantage of this embodiment is that bushes having a circular inner contour are available in great abundance and therefore at low cost in the marketplace. A further advantage of this embodiment is that cylindrical threaded bolts can easily be inserted through the circular axial bore of the bush.

According to another advantageous feature of the present invention, the positive-locking element can be shaped in the form of a stud bolt carrying two rings. The term "stud bolt" relates to a headless bolt, i.e. a bolt with a noncircular circumference having threads at both of its ends. The two rings bear in each case on one of the two end faces of the plate pack crown and serve the plate pack crown as bending edges. The inner contour of the rings corresponds to the outer contour of the stud bolt; the rings are thus seated in a torsion-proof manner in relation to the plate pack crown. An advantage of this embodiment is that the stud bolt takes on both the function of the positive-locking element and the function of a tensioning and connecting element for clamping the plate pack crown and for connecting the plate pack crown to a flange.

According to another advantageous feature of the present invention, the two rings or the collar and the ring can have an outer contour having two substantially rectilinear segments. The tangents of the two substantially rectilinear segments extend perpendicular to connecting lines defined between center points of two immediately adjacent fastening bores. An advantage of this embodiment is that the substantially rectilinear segments form an optimally positioned bending edge for an application of bending force on the plate pack crown. Owing to the linear bending edge, the compressive force acting on the plate pack is distributed over a distance and does not act on a single point. As a consequence, the permissible torque for the multi-plate coupling is increased and the permissible shaft misalignment range extended.

According to another aspect of the present invention, a laminated plate for a multi-plate coupling includes two or more continuous fastening bores, with at least one of the fastening bores having a contour diverging from a circular shape. Such plates form the basis of a multi-plate coupling according to the invention, since the torsion-proof stop of a component acting as a bending edge is based on the associated fastening bore in the plates having a contour diverging from the circular shape.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
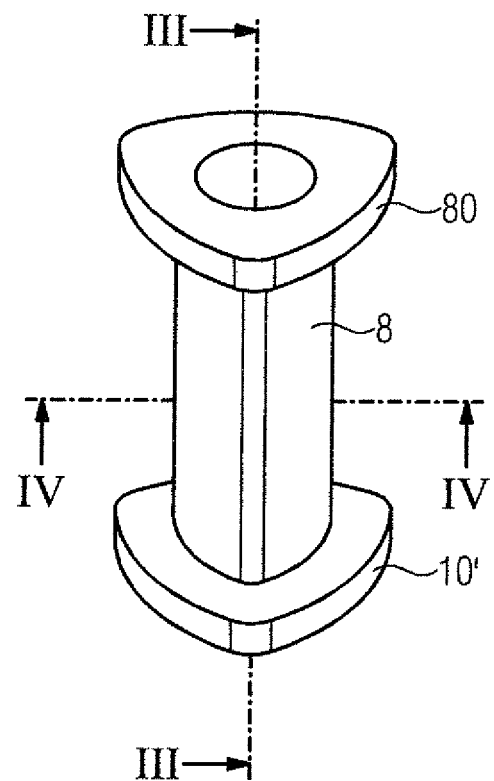
FIG. 1 is an oblique view of a collar bush having a ring.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 5:
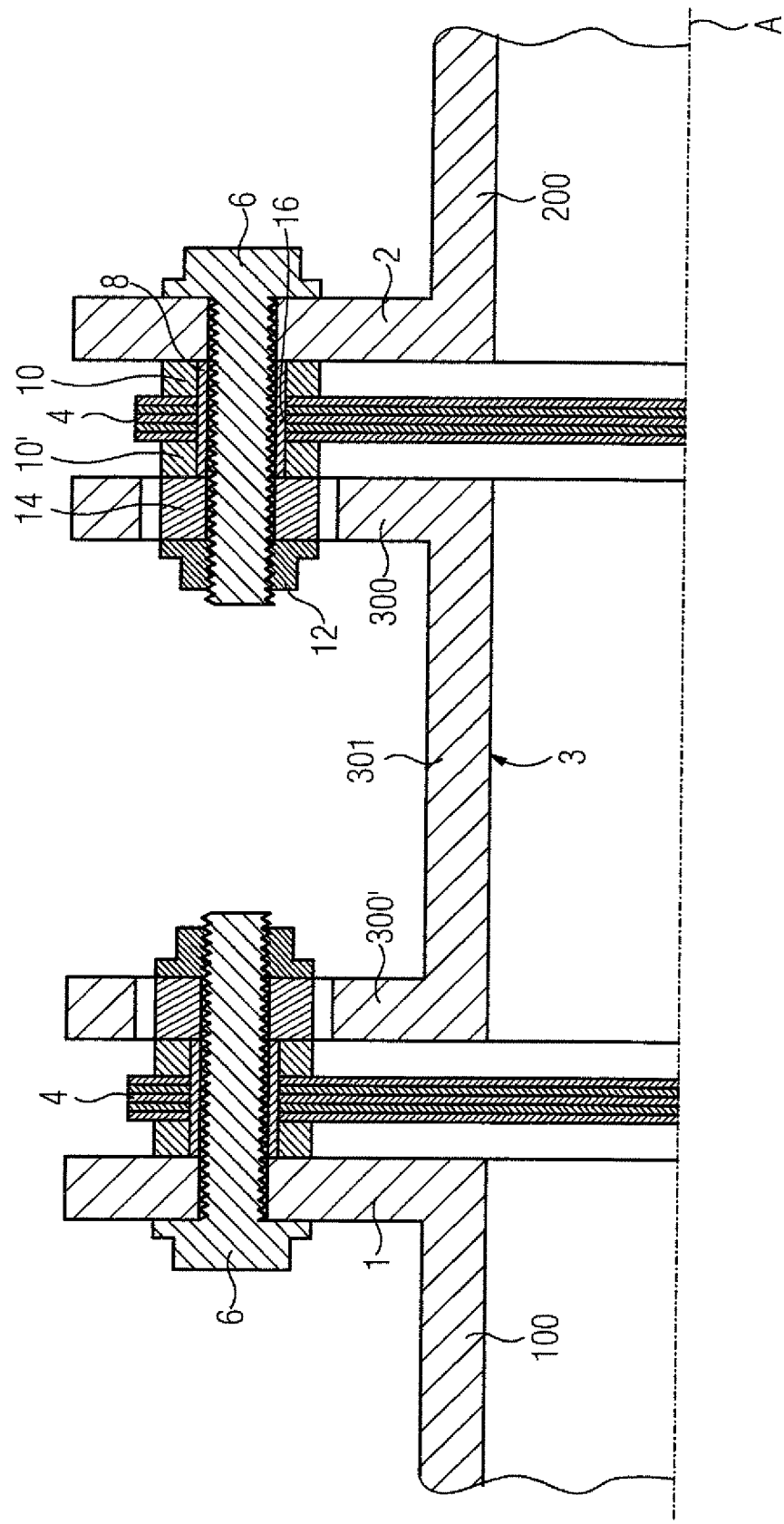
FIG. 5 is a longitudinal section through a multi-plate coupling according to the present invention.

Turning now to the drawing, and in particular to FIG. 5, there is shown a longitudinal section of a radial half of a multi-plate coupling according to the present invention. The multi-plate coupling is symmetrical in relation to a longitudinal axis A and includes two connecting flanges 1, 2 which are joined to each other in a torsionally rigid manner by means of an intermediate member 3 which is arranged between the connecting flanges 1, 2 and formed by a connecting sleeve 301 having two end-side flanges 300, 300'. The connecting flanges 1, 2 are mounted to shafts that are to be connected (not shown) by way of sleeve-shaped hubs 100, 200, e.g. by means of a clamping connection.

As the two connections between the two connecting flanges 1, 2 and the intermediate member 3 have a same construction, only the connection shown on the right-hand side in FIG. 5 is described in more detail below. A ring-shaped flange 300 of the intermediate member 3 is positioned opposite the connecting flange 2. Arranged between the two oppositely disposed ring-shaped flanges 2, 300 is a plate pack crown 4, which is formed from a plurality of laminated steel plates which are arranged stacked on top of one another in layers to form a pack. The plate pack crown 4 has a plurality of continuous fastening bores 16 distributed circumferentially and equidistantly over its circumference. The plate pack crown 4 arranged with a clearance between the flanges 2, 300 is attached alternately to the one and the other flange 2, 300 by screw fasteners such as threaded bolts 6.

In this arrangement, bushes 8 are inserted into the fastening bores 16 arranged in the plate pack crown 4. The bushes 8 have an outer contour which correspond to the contour of the fastening bores 16. A respective ring 10, 10' is carried by the bush 8 at each of the two end faces of the plate pack crown 4. A threaded bolt 6, which is guided through a bore in the hub-side flange 2 and bears with its head against the flange 2, is inserted through the bush 8. At the end of the thread of the threaded bolt 6, a threaded nut 12 presses a spacer ring 14 against the ring 10' located toward the threaded nut 12. By tightening the threaded nut 12, the plate pack crown 4 is fixedly clamped between the two rings 10, 10' and connected to the hub-side flange 2.

At an immediately adjacent fastening bore of the plate pack crown 4, the plate pack crown 4 is connected to the flange 300 of the intermediate member 3, and thus is always connected alternately to the one and the other flange 2, 300.

Figure 6:
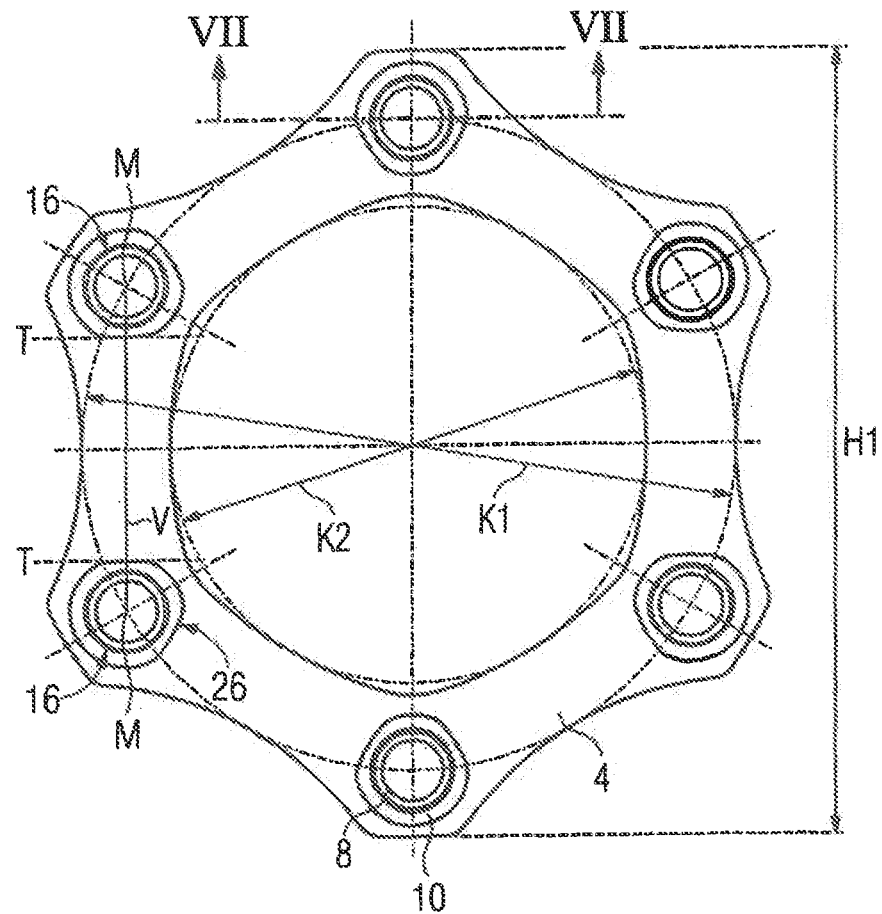
FIG. 6 is a plan view upon a plate pack crown of the multi-plate coupling.

FIG. 6 shows a view of a hexagonal plate pack crown 4 having six fastening bores 16 uniformly distributed equidistantly over the circumference. A circle K2 can be placed into the inner contour of the plate pack crown 4; in this case the inner contour diverges from the shape of the circle K2 in the sections of the fastening bores 16 to the extent that it has a greater diameter there than the circle K2. The center points of the fastening bores 16 lie on a circle K1>K2. The outer contour has a maximum diameter H that is greater than the diameter of circle K2.

A bush 8, which is encircled by a respective ring 10 at each of its two end sections, is inserted into each fastening bore 16. In this arrangement, the rings 10 have an outer contour 26 having two substantially rectilinear segments, the tangents T of which extending perpendicular to the connecting lines V of the center points M of two immediately adjacent fastening bores 16.

The plate pack crown 4 is symmetrical in shape in relation to the connecting line V which joins the center points M of the fastening bores 16. Furthermore, the outer contour of the plate pack crown 4 in the region of the fastening bores 16 follows the coupling outer diameter H1, i.e. the "corners" of the plate pack crown 4 are drawn radially further outward than is the case with conventional plate pack crowns. In the region of the fastening bores 16, the "removal" of material at the inner diameter K2 and the "addition" of material at the outer diameter H1 leads to the desired symmetry. In this way, the symmetry in the case of hexagonal plates is also maintained in the region of the fastening bores 16.

Figure 7:
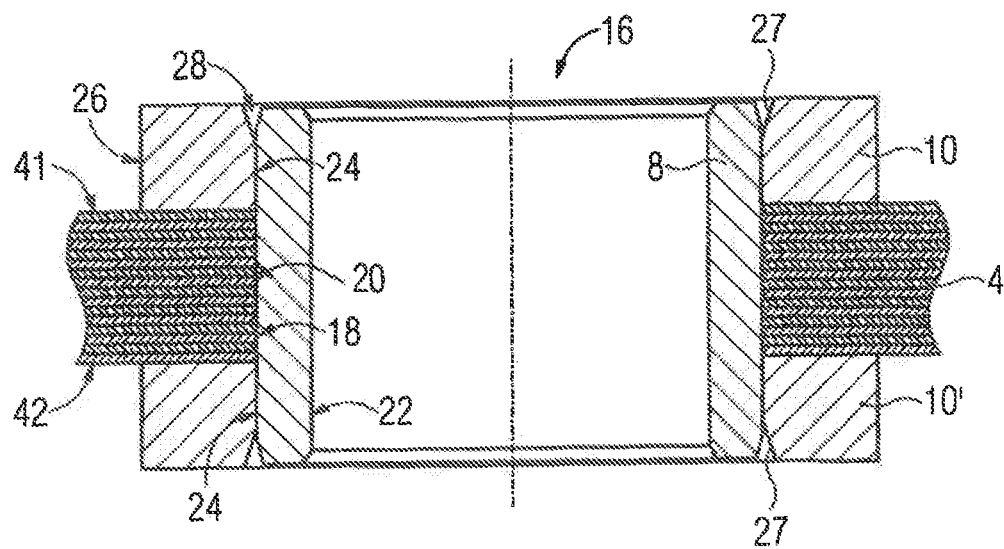
FIG. 7 is a sectional view of the plate pack crown, taken along the section line VII-VII in FIG. 6.

FIG. 7 shows section VII-VII from FIG. 6. A fastening bore 16 in the plate pack crown 4 has a contour 18 diverging from the circular shape. A bush 8 having an outer contour 20 corresponding to the contour 18 of the fastening bore 16 is inserted in a positive-locking manner into the fastening bore 16. The circular inner contour 22 of the bush 8 permits a threaded bolt (not shown) to be pushed into the bush 8.

The bush 8 carries two rings 10, 10' each bearing against one of the two end faces 41, 42 of the plate pack crown 4, which rings 10, 10' serve the plate pack crown 4 as bending edges in the event of an application of bending force and the inner contour 24 of which corresponds to the outer contour 20 of the bush 8. The rings 10, 10' therefore bear on the outer contour 20 of the bush 8 in a positive-locking manner. In this arrangement, as already explained above with reference to FIG. 6, the rings 10 have an outer contour 26 having two substantially rectilinear segments, the tangents T of which extending perpendicular to the connecting lines V of the center points M of two immediately adjacent fastening bores 16.

The rings 10, 10' are pushed so far over the two ends of the bush 8 that they bear against the end faces 41, 42 of the plate pack crown 4. The ends of the bush 8 are each flanged by means of the abutting ring 10, 10'. In this process, the bush 8 is deformed outwardly at its end. The free space 28 in the region of the bezel 27 of the ring 10, 10' enables said deformation. Due to the deformation, the ring 10, 10' is pressed axially against the top plate at the end faces 41, 42 of the plate pack crown 4.

FIG. 1 shows an oblique view of a collar bush 8, 80 having a ring 10'. A collar bush 8, 80 is a bush 8 that has a collar 80 at one end. The ring 10' is pushed onto the end of the bush 8 located opposite the collar 80. The bush 8 has an outer contour diverging from the circular shape.

Figure 2:
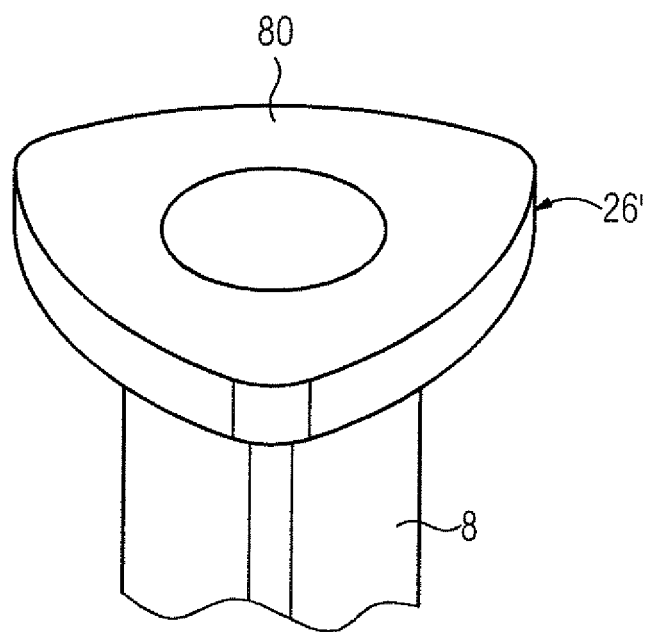
FIG. 2 is an enlarged view of the collar of FIG. 1.

FIG. 2 shows an enlarged view of the collar 80 from FIG. 1. The collar 80 has an outer contour 26' diverging from the circular shape.

Figure 3:
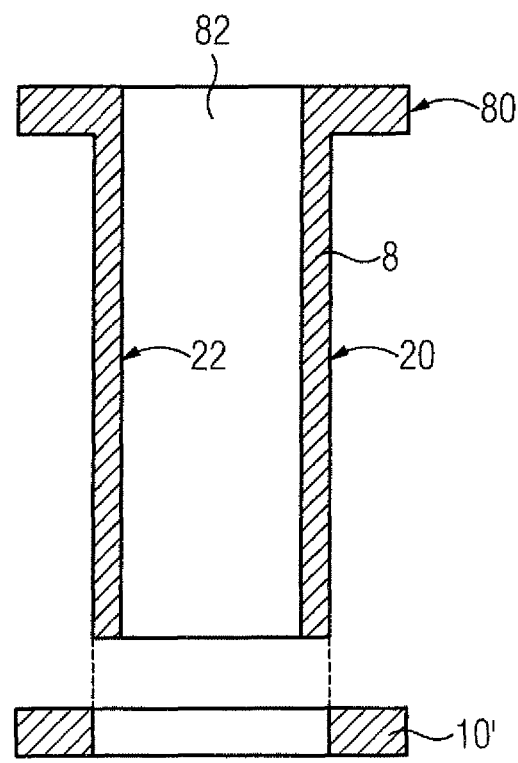
FIG. 3 is a sectional view of the collar bush, taken along the section line III-III in FIG. 1 with ring removed.
Figure 4:
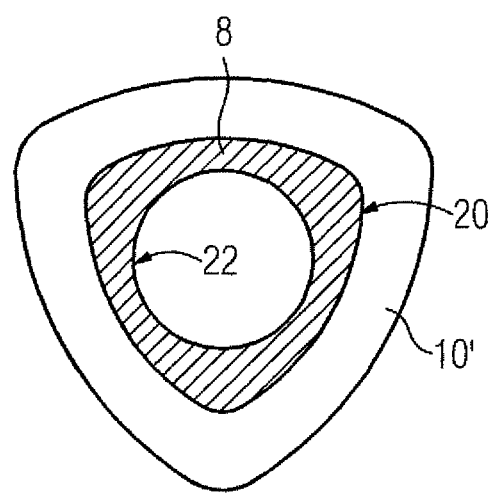
FIG. 4 is a sectional view of the collar bush, taken along the section line IV-IV in FIG. 1.

FIG. 3 shows section III-III from FIG. 1, with the ring 10' having been removed from the collar bush 8, 80. FIG. 4 shows section IV-IV from FIG. 1, i.e. a section through the bush 8 transversely to the longitudinal axis of the bush 8. The bush 8 has an outer contour 20 diverging from the circular shape and an arbitrarily shaped inner contour 22. By contour is understood the shape of the circumference. The inner contour 22 is limited in shape only to the extent that it must be able to accommodate a screw fastener, e.g. a threaded bolt.

Figure 8:
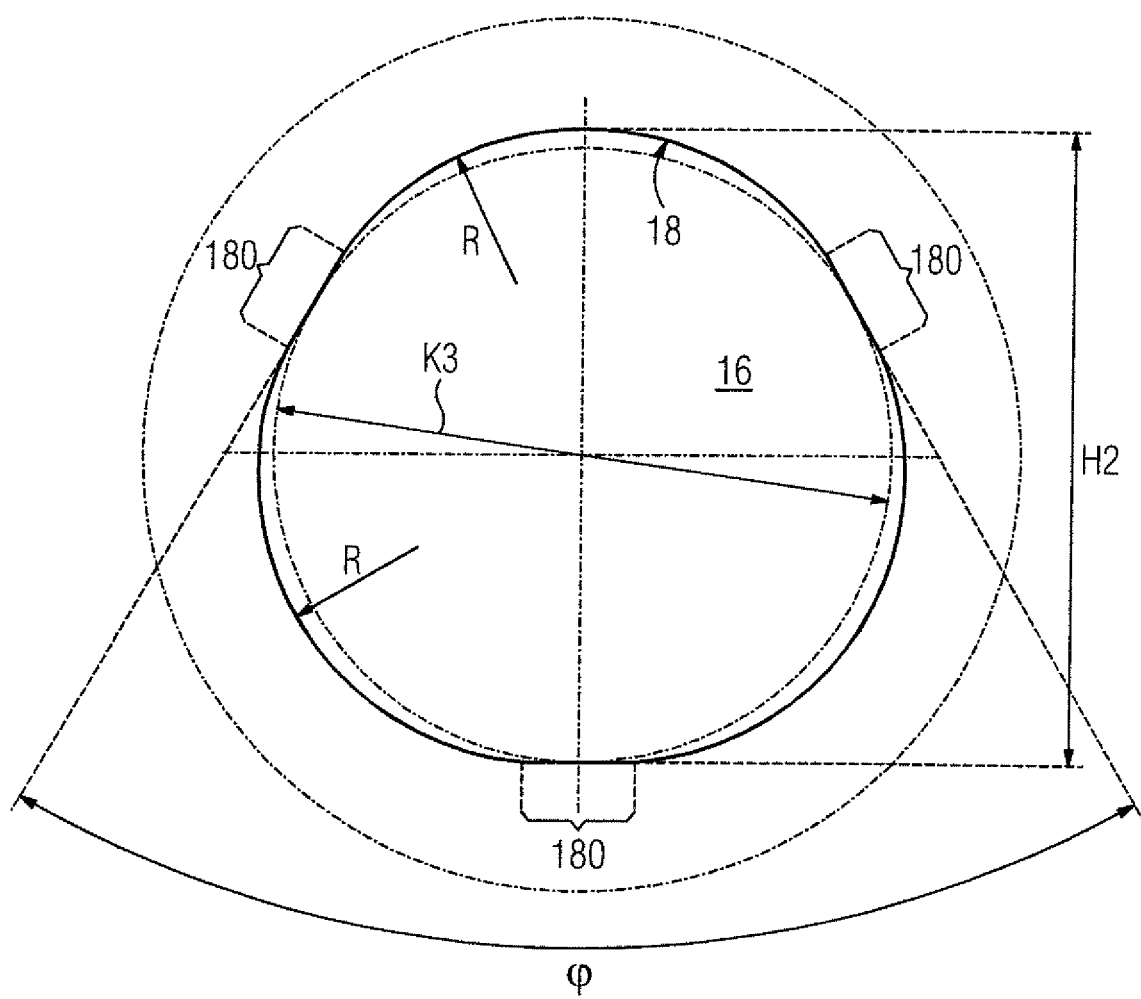
FIG. 8 is an illustration of a contour of a fastening bore in the form of a rounded triangle.

FIG. 8 shows a contour of a fastening bore 16 in the form of a rounded triangle. A circle K3 can be placed into the contour 18. The maximum radial dimension H2 of the fastening bore 16 is greater than the circle K3. In the region of the angles 0, 120 and 240 degrees, the contour 18 is radially greater than the circle K3. Therebetween, i.e. in the region of the angles 60, 180 and 300 degrees, the contour 18 bears on the circle K3; in these three sections, the contour 18 has substantially rectilinear segments 180. The tangents at two adjacent rectilinear segments 180 include an angle φ, wherein in the case of the present fastening bore 16 in the form of a rounded triangle φ lies at 60 degrees.

Figure 9:
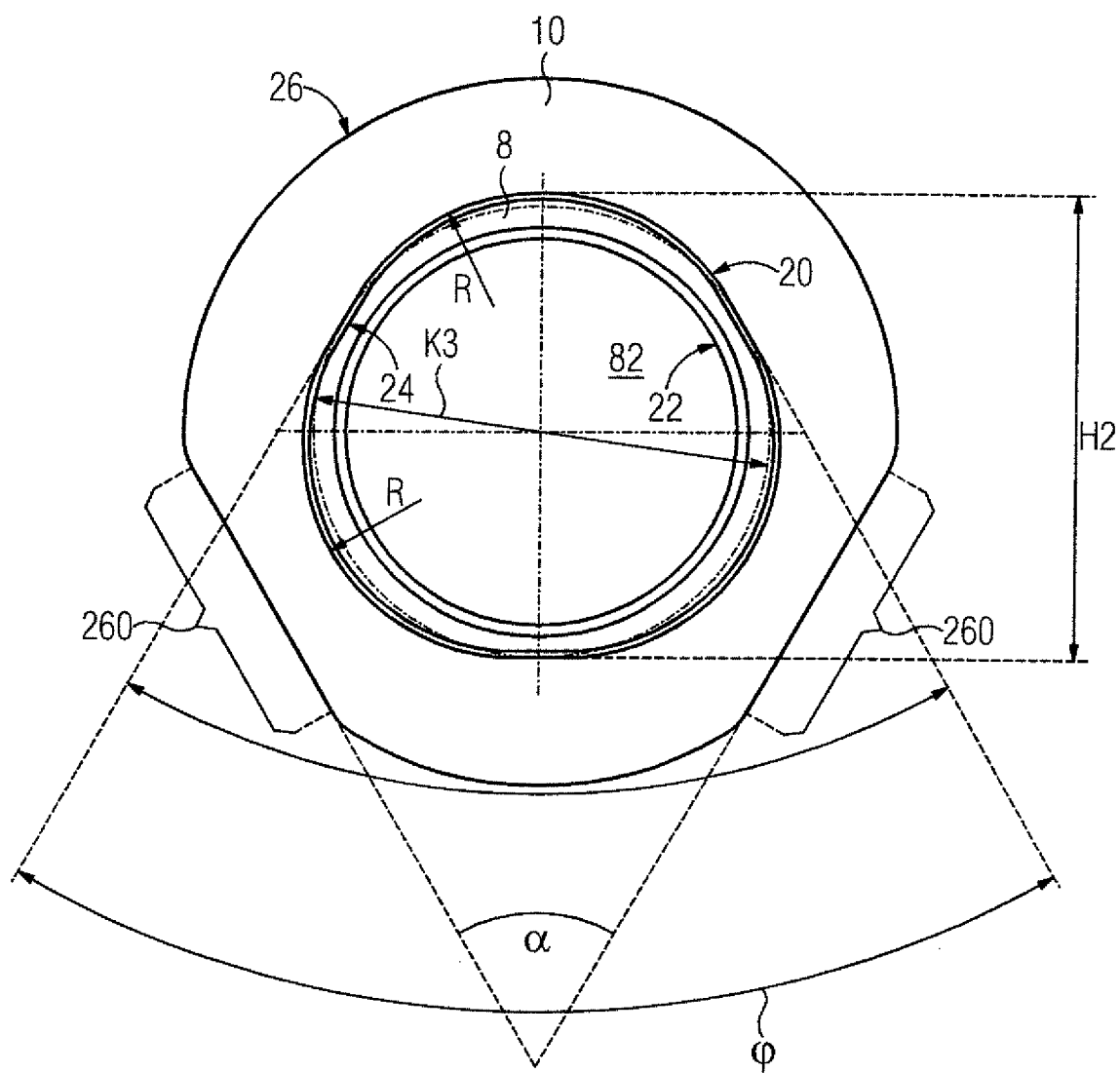
FIG. 9 is an illustration of contours of a bush and a ring for the fastening bore in FIG. 8.

FIG. 9 shows the contours of a bush 8 and a ring 10 for the fastening bore 16 in FIG. 8. The outer contour 20 of the bush 8 corresponds to the contour 18 of the fastening bore 16, such that the bush 8 is seated in the fastening bore 16 in a positive-locking and torsion-proof manner. The axial bore 82 of the bush 8 is delimited by the inner contour 22 of the bush. A ring 10, the inner contour 24 of which corresponds to the outer contour 20 of the bush 8, is placed around the end of the bush 8. The outer contour 26 of the ring 10 has two sections offset by the angle α of 60 degrees and having substantially rectilinear segments 260: In these sections, the ring 10 serves the plate pack crown as a bending edge in the event of an application of bending force.

Figure 10:
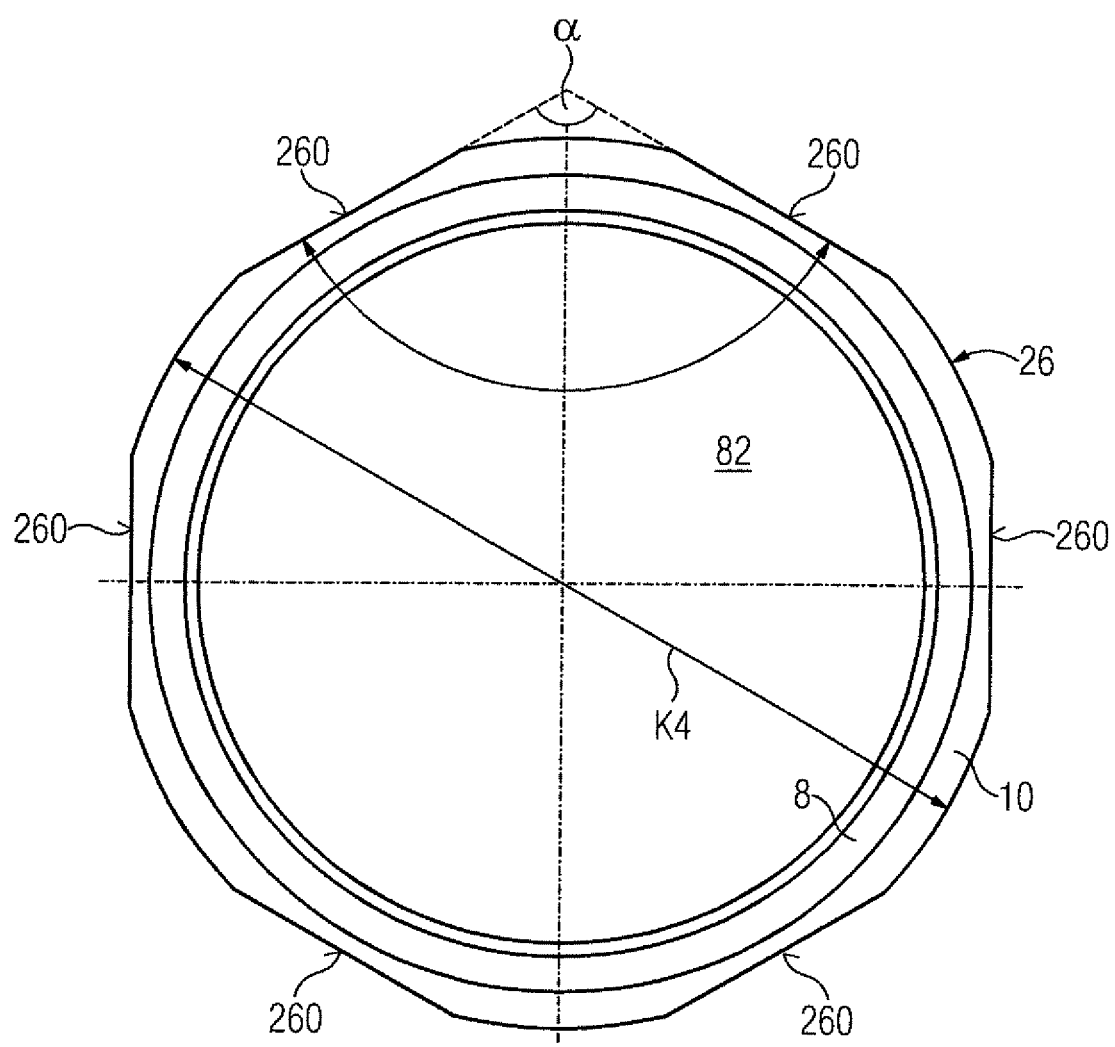
FIG. 10 is an illustration of alternative contours of a bush and a ring for the fastening bore in FIG. 8.

FIG. 10 shows alternative contours of a bush 8 and a ring 10 for the fastening bore 16 in FIG. 8. The outer contour 26 of the ring 10 follows a circle K4. In this arrangement, the ring 10 has six sections having substantially rectilinear segments 260. The tangents at two adjacent rectilinear segments 260 include an angle α of 120 degrees.

Figure 11:
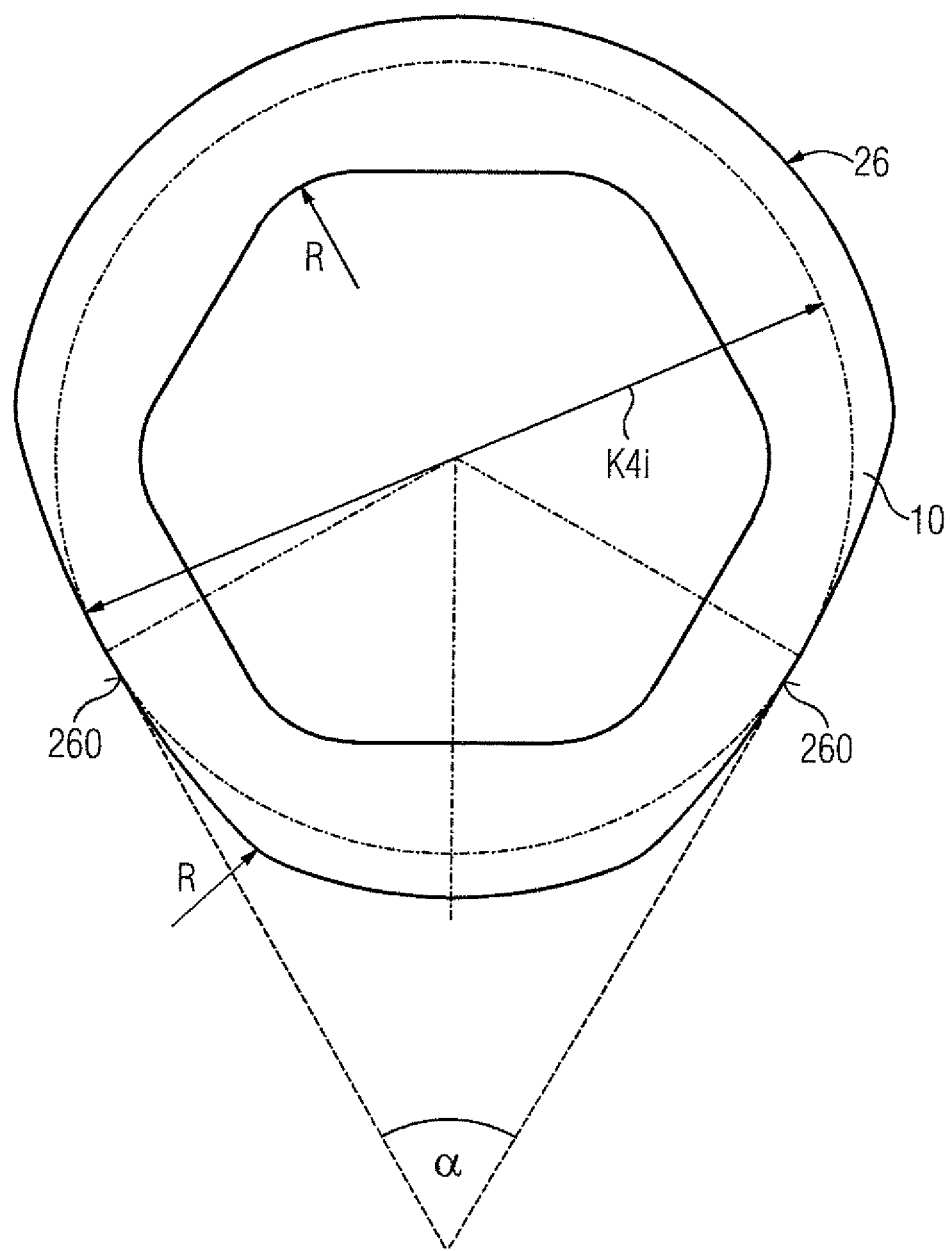
FIG. 11 is an illustration of contours of a ring for a fastening bore in the form of a rounded hexagon.

FIG. 11 shows contours of a ring 10 for a fastening bore in the form of a rounded hexagon. The outer contour 26 of the ring 10 follows a circle K4*i*. In this arrangement, the ring 10 has two sections having substantially rectilinear segments 260. The tangents to the two adjacent rectilinear segments 260 include an angle α of 60 degrees.

Figure 12:
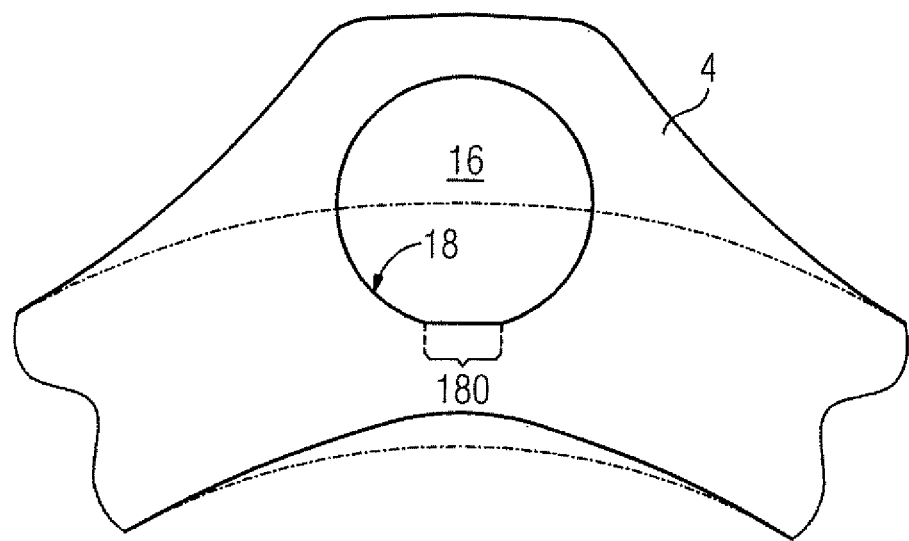
FIG. 12 is an illustration of a contour of a fastening bore in the form of a circle having a straight edge.

FIG. 12 shows a contour of a fastening bore 16 having a circle-shaped contour which is interrupted at one point by a chord of a circle 180, i.e. a straight edge.

Figure 13:
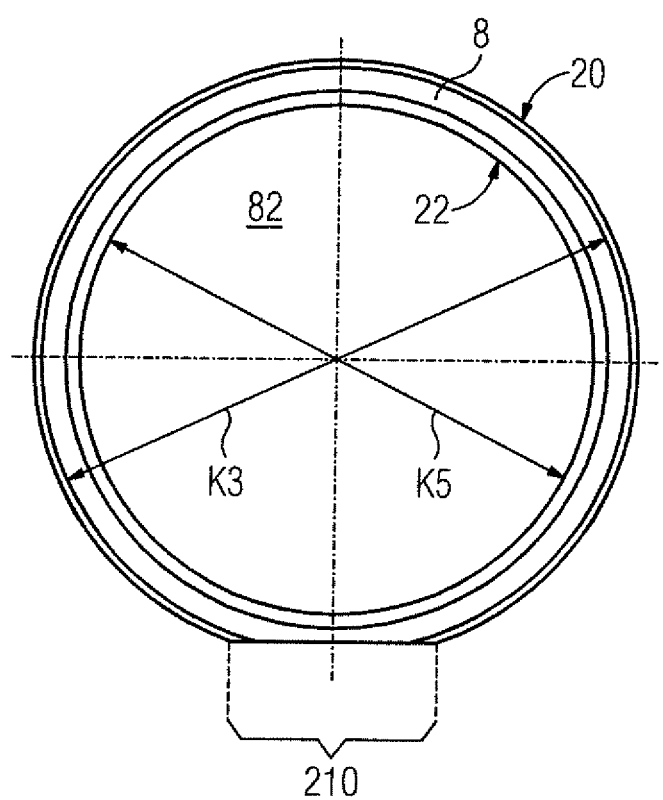
FIG. 13 is an illustration of a contour of a bush for the fastening bore in FIG. 12.

FIG. 13 shows the contour of a bush 8 for the fastening bore 16 in FIG. 12. The inner contour 22 of the bush 8 corresponds to a circle K5. Corresponding to the contour 18 of the fastening bore 16, the otherwise circular outer contour 20 of the bush 8, following a circle K3, has a straight edge 210 at a point on the circumference. When the bush 8 is inserted into the fastening bore 16, the straight edge 210 of the bush 8 comes to lie on the chord of the circle 180 of the fastening bore 16.

Figure 14:
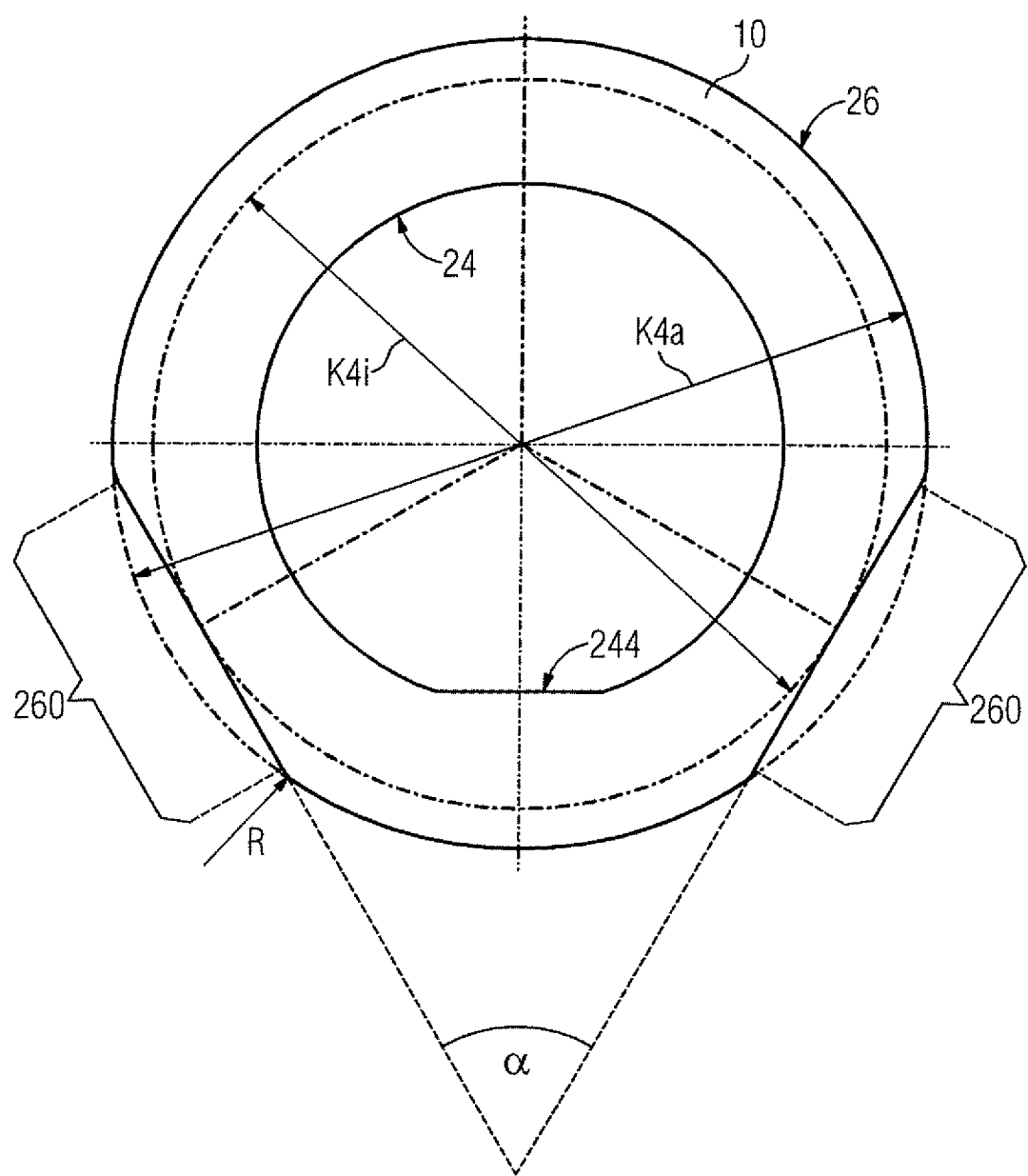
FIG. 14 is an illustration of a contour of a ring for the bush in FIG. 13.

FIG. 14 shows the contour of a ring 10 for the bush 8 in FIG. 13. Corresponding to the outer contour 20 of the bush 8, the otherwise circular inner contour 24 of the ring 10 has a straight edge 244 at a point on the circumference. When the ring 10 is slipped onto the bush 8, the straight edge 244 of the ring 10 comes to lie on the straight edge 210 of the bush 8. The outer contour 26 of the ring 10 follows a circle K4*a*. In this arrangement, the ring 10 has two sections having substantially rectilinear segments 260. The tangents to the two adjacent rectilinear segments 260 include an angle α of 60 degrees. In this arrangement, the two rectilinear segments 260 form tangents to a circle K4*i* which is smaller than the circle K4*a*.

Figure 15:
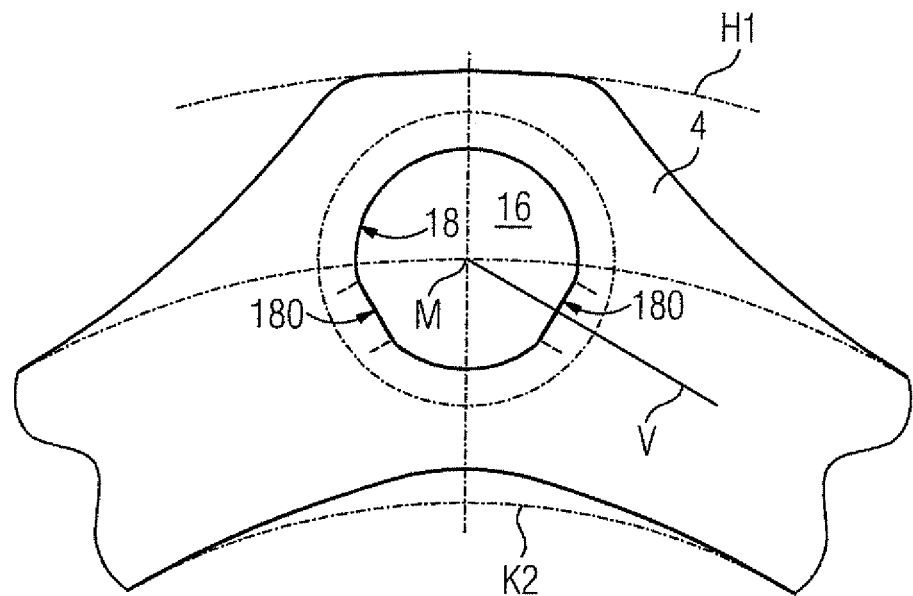
FIG. 15 is an illustration of a contour of a fastening bore in the form of a circle having two straight edges.

FIG. 15 shows a contour of a fastening bore 16 in the form of a circle having two straight edges 180 which extend perpendicular to the connecting lines V to the center points M of the two immediately adjacent fastening bores 16. The plate pack crown 4 into which the fastening bore 16 is introduced has an outer circumference which touches a circle H1 in certain segments and an inner circumference which touches a circle K2 in certain segments.

Figure 16:
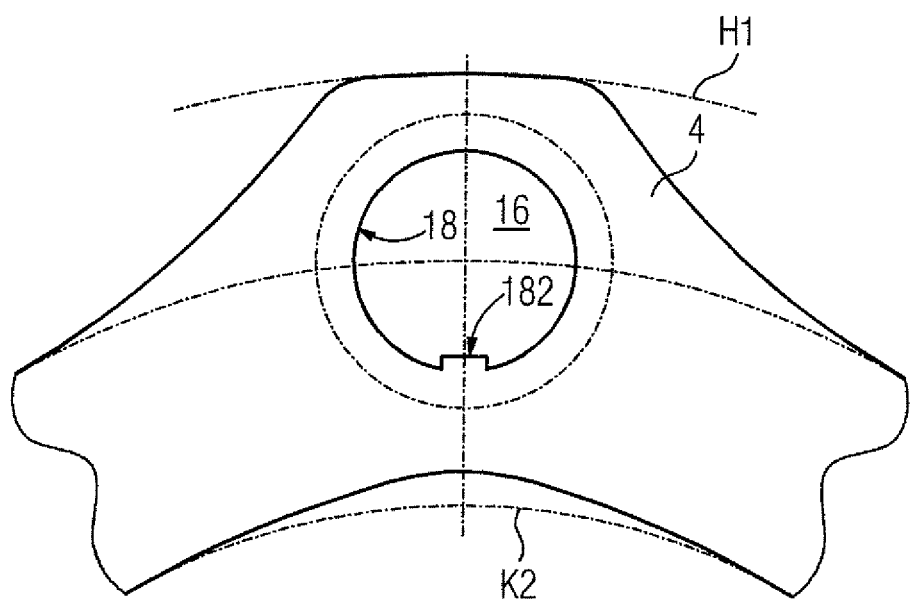
FIG. 16 is an illustration of a contour of a fastening bore in the form of a circle having a projecting nose.

FIG. 16 shows, in a plate pack crown 4 having an outer circumference touching a circle H1 in certain segments, a contour 18 of a fastening bore 16 in the form of a circle having a nose 182 projecting radially toward the center point of the fastening bore 16.

Figure 17:
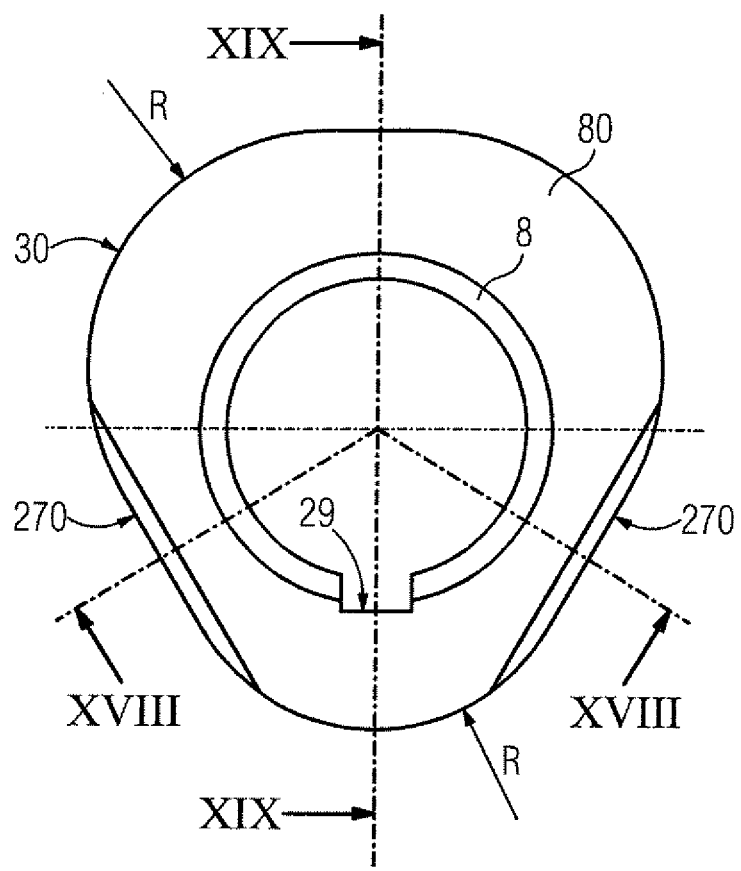
FIG. 17 is an illustration of a contour of a collar bush for the fastening bore in FIG. 16.

FIG. 17 shows a contour of a collar bush 8, 80 for the fastening bore in FIG. 16. The bush 8 is slotted in the axial direction so that the bush 8 can be inserted into the fastening bore 16: The slot comes to lie on the projecting nose 182 of the fastening bore 16. The inner contour 29 of the collar 80 follows the circular outer contour of the bush 8, but likewise has a slot. The outer contour 30 of the collar 80 has two sections having substantially rectilinear segments 270.

Figure 18:
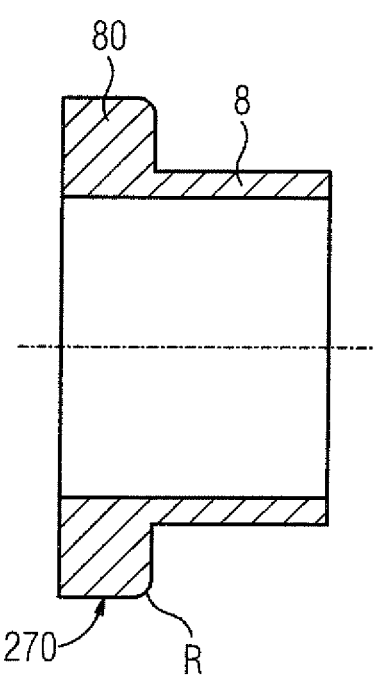
FIG. 18 is a sectional view of the collar bush, taken along the section line XVIII-XVIII in FIG. 17.

FIG. 18 shows the section XVIII-XVIII from FIG. 17. In the two sections of the outer contour 30 of the collar 80 having the substantially rectilinear segments 270, the edge coming to bear against the plate pack crown 4 has a radius of curvature R; the notching effect of the edges of the rectilinear segments 270 serving the plate pack crown 4 as bending edges in the event of an application of bending force is reduced as a result.

Figure 19:
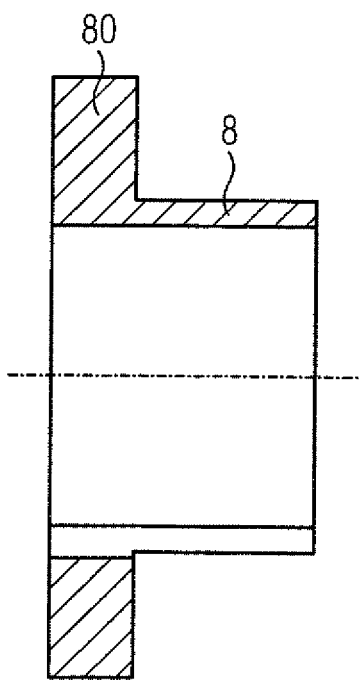
FIG. 19 is a sectional view of the collar bush, taken along the section line XIX-XIX in FIG. 17.

FIG. 19 shows the section XIX-XIX from FIG. 17, in which the slots producing a torsion-proof stop in bush 8 and collar 80 can be seen.

Figure 20:
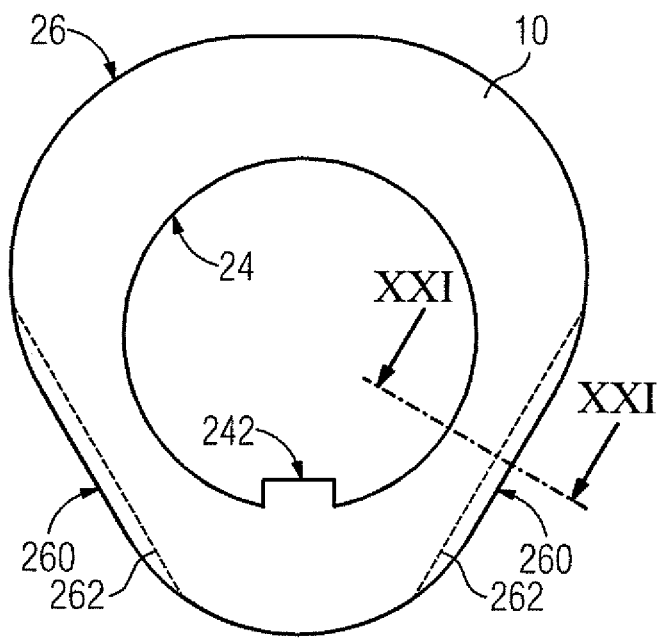
FIG. 20 is an illustration of a contour of a ring for the collar bush in FIG. 17.

FIG. 20 shows a contour of a ring 10 for the collar bush 8, 80 in FIG. 17. The ring 10 is slipped onto the end of the bush 8 located opposite the collar. The inner contour 24 of the ring 10 has the shape of a circle having a nose 242 projecting radially toward the center point of the ring 10, which nose 242 is introduced into the slot of the bush 8. The outer contour 26 has two sections having substantially rectilinear segments 260. In the two sections of the outer contour 26 of the ring 10 having the substantially rectilinear segments 260, the edge 262 coming to bear against the plate pack crown 4 has a radius of curvature R; the notching effect of the edges 262 of the rectilinear segments 260 serving the plate pack crown 4 as bending edges in the event of an application of bending force is reduced as a result.

Figure 21:
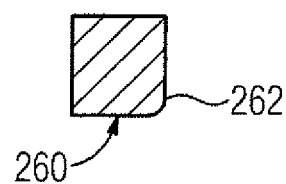
FIG. 21 is a sectional view of the ring, taken along the section line XXI-XXI in FIG. 20.

FIG. 21 shows the section XXI-XXI from FIG. 20, in which the edge 262 having the radius of curvature can be seen.

Figure 22:
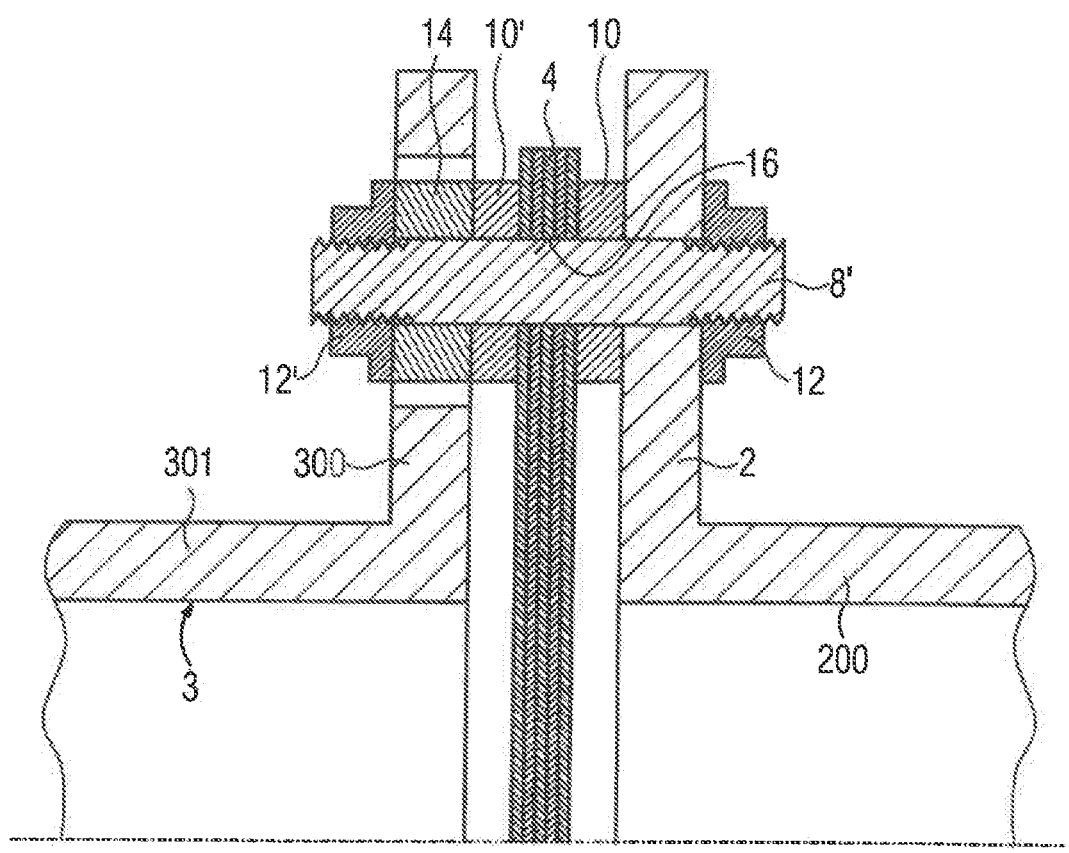
FIG. 22 is a detailed longitudinal section on an enlarged scale of another embodiment of a further multi-plate coupling according to the present invention.

FIG. 22 shows a detail of a longitudinal section through a further multi-plate coupling. The detail shown in FIG. 22 is similar to the flange connection shown on the right in FIG. 5, though in contrast to the multi-plate coupling shown in FIG. 5, instead of a threaded bolt in combination with a positive-locking element in the form of a bush, stud bolts are used without a separate bush, since the stud bolts themselves serves as the positive-locking element.

A ring-shaped flange 300 of an intermediate member 3 of the multi-plate coupling is positioned opposite a first connecting flange 2 of the multi-plate coupling, which can be mounted on a shaft (not shown) by way of a sleeve-shaped hub 200. Arranged between the two oppositely disposed ring-shaped flanges 2, 300 is a plate pack crown 4 which is formed from a plurality of laminated steel plates, which are arranged stacked on top of one another in layers to form a pack. The plate pack crown 4 has a plurality of continuous fastening bores 16 distributed circumferentially and equidistantly over its circumference. The plate pack crown 4 arranged with a clearance between the flanges 2, 300 is attached alternately to the one and the other flange 2, 300 by means of positive-locking elements in the form of stud bolts 8'.

In this arrangement, stud bolts 8 are inserted into the fastening bores 16 arranged in the plate pack crown 4, the outer contour of the stud bolts 8 corresponding to the contour of the fastening bores 16. A respective ring 10, 10' is carried by the stud bolt 8' at each of the two end faces of the plate pack crown 4. At the first end of the thread of the stud bolt 6 located at the connecting flange 2, a first threaded nut 12 presses the connecting flange 2 against the ring 10 located toward the threaded nut 12. At the second end of the thread of the stud bolt 6 located at the flange 300 of the intermediate member 3, a second threaded nut 12' presses a spacer ring 14 against the ring 10' located toward the second threaded nut 12'. By tightening the two threaded nuts 12, 12', the plate pack crown 4 is fixedly clamped between the two rings 10, 10' and connected to the hub-side flange 2.

At an immediately adjacent fastening bore of the plate pack crown 4, the plate pack crown 4 is connected to the flange 300 of the intermediate member 3, and in this way is always connected alternately to the one and the other flange 2, 300.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A multi-plate coupling, comprising:
two connecting flanges;
an intermediate member arranged between the connecting flanges;
plate pack crowns, one of the plate pack crowns being arranged between one of the connecting flanges and the intermediate member, and another one of the plate pack crowns being arranged between the other one of the connecting flanges and the intermediate member;
screw fasteners guided through continuous fastening bores in the plate pack crowns in alternating manner to connect the plate pack crowns to the connecting flanges, with at least one of the fastening bores of the plate pack crowns having a contour diverging from the circular shape;
a positive-locking element configured for insertion into the at least one of the fastening bores and having an outer contour corresponding to the contour of the at least one of the fastening bores, said positive-locking member including a component configured to bear on the outer contour of the positive-locking element in a positive-locking manner to provide a bending edge for an associated one of the plate pack crowns,
wherein the positive-locking element has a non-circular outer circumference,
wherein the positive-locking elements is configured in the form of a bush and the component is configured in the form of two rings respectively bearing against two end faces of the associated one of the plate pack crowns to provide the bending edge for said plate pack crown, said rings having an inner contour which corresponds to the outer contour of the bush.

2. The multi-plate coupling of claim 1, wherein the two rings have an outer contour with two substantially rectilinear segments defining tangents which extend perpendicular to connecting lines defined between center points of two adjacent ones of the fastening bores.

3. The multi-plate coupling of claim 1, wherein the bush has a circular inner contour.

4. A multi-plate coupling, comprising:
two connecting flanges;
an intermediate member arranged between the connecting flanges;
plate pack crowns, one of the plate pack crowns being arranged between one of the connecting flanges and the intermediate member, and another one of the plate pack crowns being arranged between the other one of the connecting flanges and the intermediate member;
screw fasteners guided through continuous fastening bores in the plate pack crowns in alternating manner to connect the plate pack crowns to the connecting flanges, with at least one of the fastening bores of the plate pack crowns having a contour diverging from the circular shape;

a positive-locking element configured for insertion into the at least one of the fastening bores and having an outer contour corresponding to the contour of the at least one of the fastening bores, said positive-locking member including a component configured to bear on the outer contour of the positive-locking element in a positive-locking manner to provide a bending edge for an associated one of the plate pack crowns, wherein the positive-locking element has a non-circular outer circumference, wherein the positive-locking element is configured in the form of a bush and the component is configured in the form of a collar and a ring, said bush having an axial end section provided with the collar which bears against an end face of the associated one of the plate pack crowns and another end section carrying the ring which bears against another end face of said plate pack crown and has an inner contour which corresponds to the outer contour of the bush, the collar and the ring providing said plate pack crown as bending edges.

5. The multi-plate coupling of claim 4, wherein the collar and the ring have an outer contour with two substantially rectilinear segments defining tangents which extend perpendicular to connecting lines defined between center points of two adjacent ones of the fastening bores.

6. A multi-plate coupling, comprising:
two connecting flanges;
an intermediate member arranged between the connecting flanges;
plate pack crowns, one of the plate pack crowns being arranged between one of the connecting flanges and the intermediate member, and another one of the plate pack crowns being arranged between the other one of the connecting flanges and the intermediate member;
screw fasteners guided through continuous fastening bores in the plate pack crowns in alternating manner to connect the plate pack crowns to the connecting flanges, with at least one of the fastening bores of the plate pack crowns having a contour diverging from the circular shape;
a positive-locking element configured for insertion into the at least one of the fastening bores and having an outer contour corresponding to the contour of the at least one of the fastening bores, said positive-locking member including a component configured to bear on the outer contour of the positive-locking element in a positive-locking manner to provide a bending edge for an associated one of the plate pack crowns,
wherein the positive-locking element has a non-circular outer circumference,
wherein the positive-locking element is configured in the form of a stud bolt and the component is configured in the form of two rings which each bear against one of two end faces of the associated one of the plate pack crown and provide bending edges for said plate pack crown, said rings having an inner contour which corresponds to the outer contour of the stud bolt.

7. The multi-plate coupling of claim 6, wherein the two rings have an outer contour with two substantially rectilinear segments defining tangents which extend perpendicular to connecting lines defined between center points of two adjacent ones of the fastening bores.

* * * * *